(12) United States Patent
Yasuda et al.

(10) Patent No.: US 6,917,026 B2
(45) Date of Patent: Jul. 12, 2005

(54) RADIATION-IMAGE READOUT APPARATUS AND LINE SENSOR TO BE DEPLOYED THEREIN

(75) Inventors: Hiroaki Yasuda, Kaisei-machi (JP); Satoshi Arakawa, Kaisei-machi (JP); Jin Murayama, Miyagi-ken (JP); Tetsuo Yamada, Miyagi-ken (JP); Tatsuya Hagiwara, Miyagi-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/059,350

(22) Filed: Jan. 31, 2002

(65) Prior Publication Data

US 2002/0100886 A1 Aug. 1, 2002

(30) Foreign Application Priority Data

Feb. 1, 2001 (JP) .................................... 2001-025238

(51) Int. Cl.$^7$ ................................................ H04N 1/04
(52) U.S. Cl. .................... 250/208.1; 250/586; 358/483; 348/316
(58) Field of Search ................................ 250/586, 208.1, 250/234, 235, 236; 348/316, 323, 324; 358/482, 483

(56) References Cited

U.S. PATENT DOCUMENTS

| | | | |
|---|---|---|---|
| 4,192,015 A | * 3/1980 | Tompsett | 365/114 |
| 4,258,264 A | 3/1981 | Kotera et al. | |
| 4,276,473 A | 6/1981 | Kato et al. | |
| 4,387,428 A | 6/1983 | Ishida et al. | |
| 4,432,017 A | * 2/1984 | Stoffel et al. | 348/316 |
| 4,654,713 A | * 3/1987 | Boucharlat et al. | 348/295 |
| 4,665,440 A | * 5/1987 | Tromborg | 348/316 |
| 4,816,679 A | 3/1989 | Sunagawa et al. | |
| 4,922,103 A | 5/1990 | Kawajiri et al. | |
| 4,928,158 A | * 5/1990 | Kimata | 257/231 |
| 5,027,195 A | * 6/1991 | Cooley et al. | 358/500 |
| 5,285,295 A | * 2/1994 | Kai et al. | 358/482 |
| 5,379,067 A | * 1/1995 | Miura | 348/311 |
| 5,416,611 A | * 5/1995 | Tandon | 358/474 |
| 5,652,664 A | * 7/1997 | Kusaka et al. | 358/483 |
| 5,654,556 A | * 8/1997 | Yasuda | 250/584 |
| 6,031,638 A | * 2/2000 | Rao et al. | 358/474 |
| 6,153,874 A | * 11/2000 | Monoi | 250/208.1 |
| 6,166,831 A | * 12/2000 | Boyd et al. | 358/483 |
| 6,204,495 B1 | * 3/2001 | Iwabuchi | 250/208.1 |
| 6,242,727 B1 | * 6/2001 | Nakamura | 250/201.2 |
| 6,326,636 B1 | * 12/2001 | Isoda et al. | 250/586 |

FOREIGN PATENT DOCUMENTS

| | | |
|---|---|---|
| JP | 55-12429 | 1/1980 |
| JP | 1-101540 | 4/1989 |

OTHER PUBLICATIONS

Japanese abstract 01–101540, Apr. 19, 1989.

* cited by examiner

Primary Examiner—R. Alexander Smith
(74) Attorney, Agent, or Firm—Sughrue Mion, PLLC

(57) ABSTRACT

A radiation-image data readout apparatus in which the charge transferring time occurring during a readout operation utilizing a line sensor having a broad-width light-receiving portion is shortened is provided. A line sensor having two photodiode portions, each having a width of 100 um, disposed adjacently with a microscopic gap therebetween, and a charge transferring device corresponding to each photodiode portion provided on the exterior side in the width direction of each corresponding photodiode portion, are provided.

9 Claims, 9 Drawing Sheets

F I G . 1
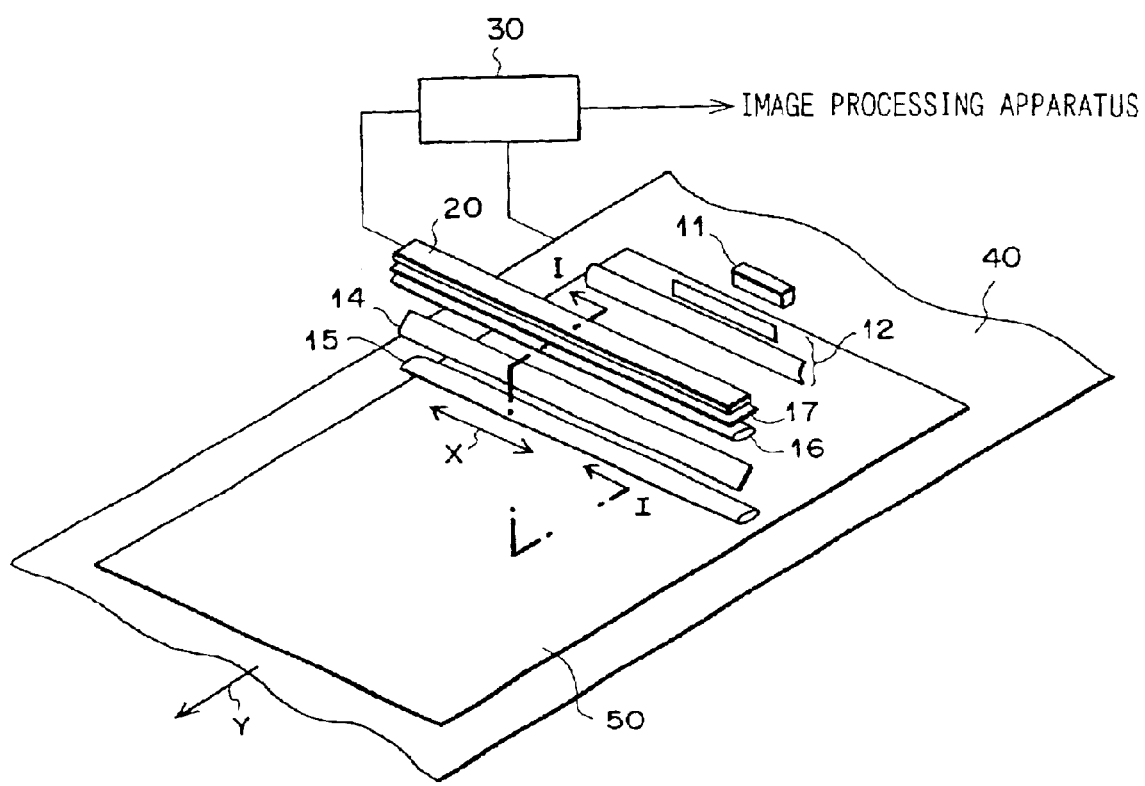
→ IMAGE PROCESSING APPARATUS

SECT. I-I

F I G. 4
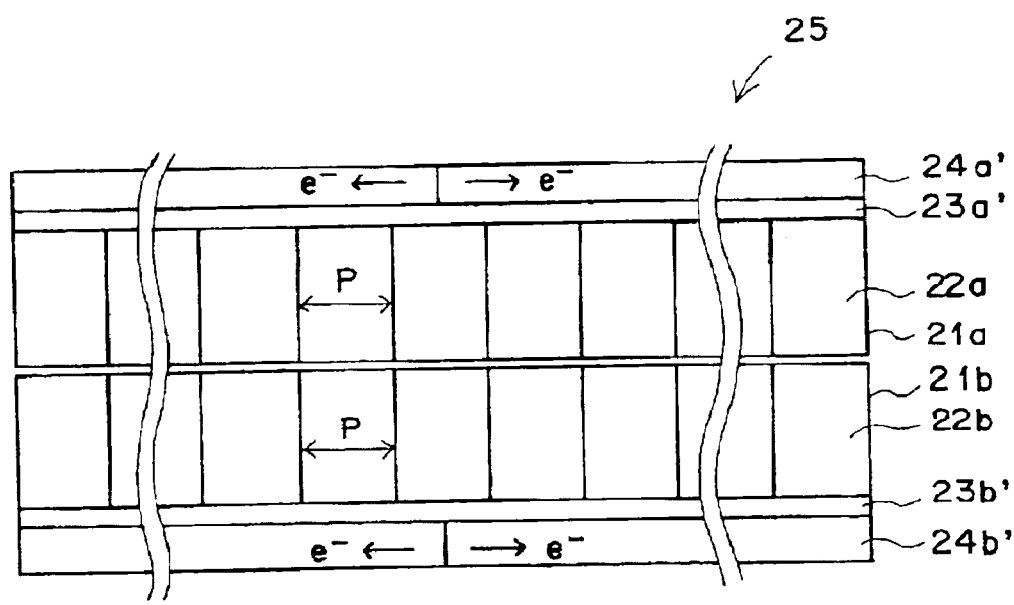
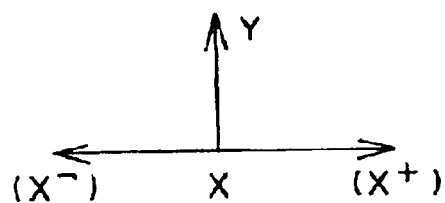

F I G . 6
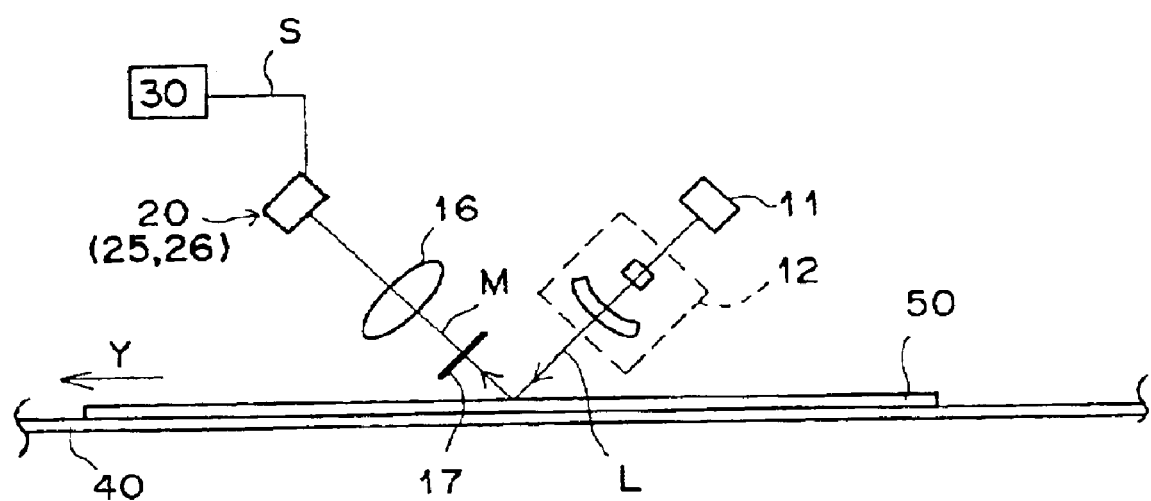

F I G. 8
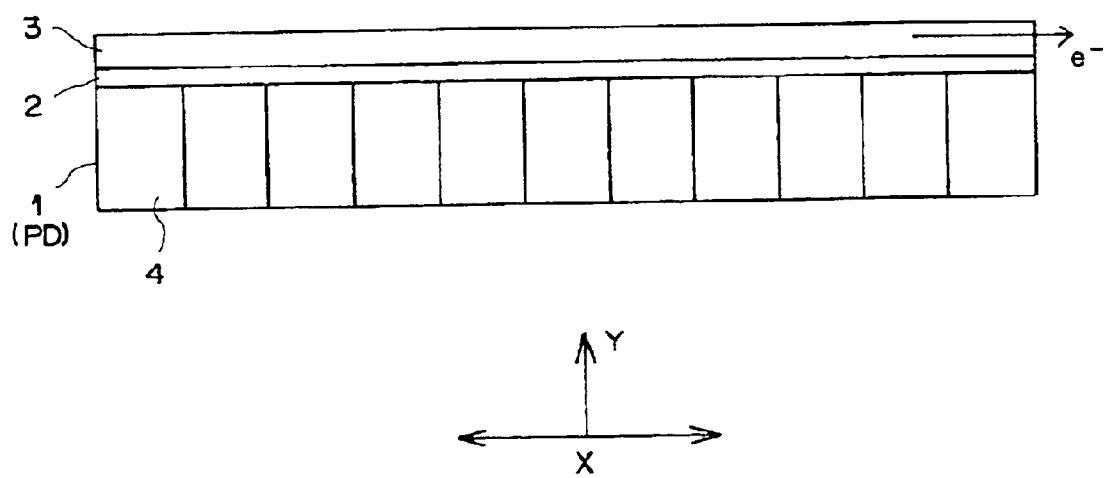

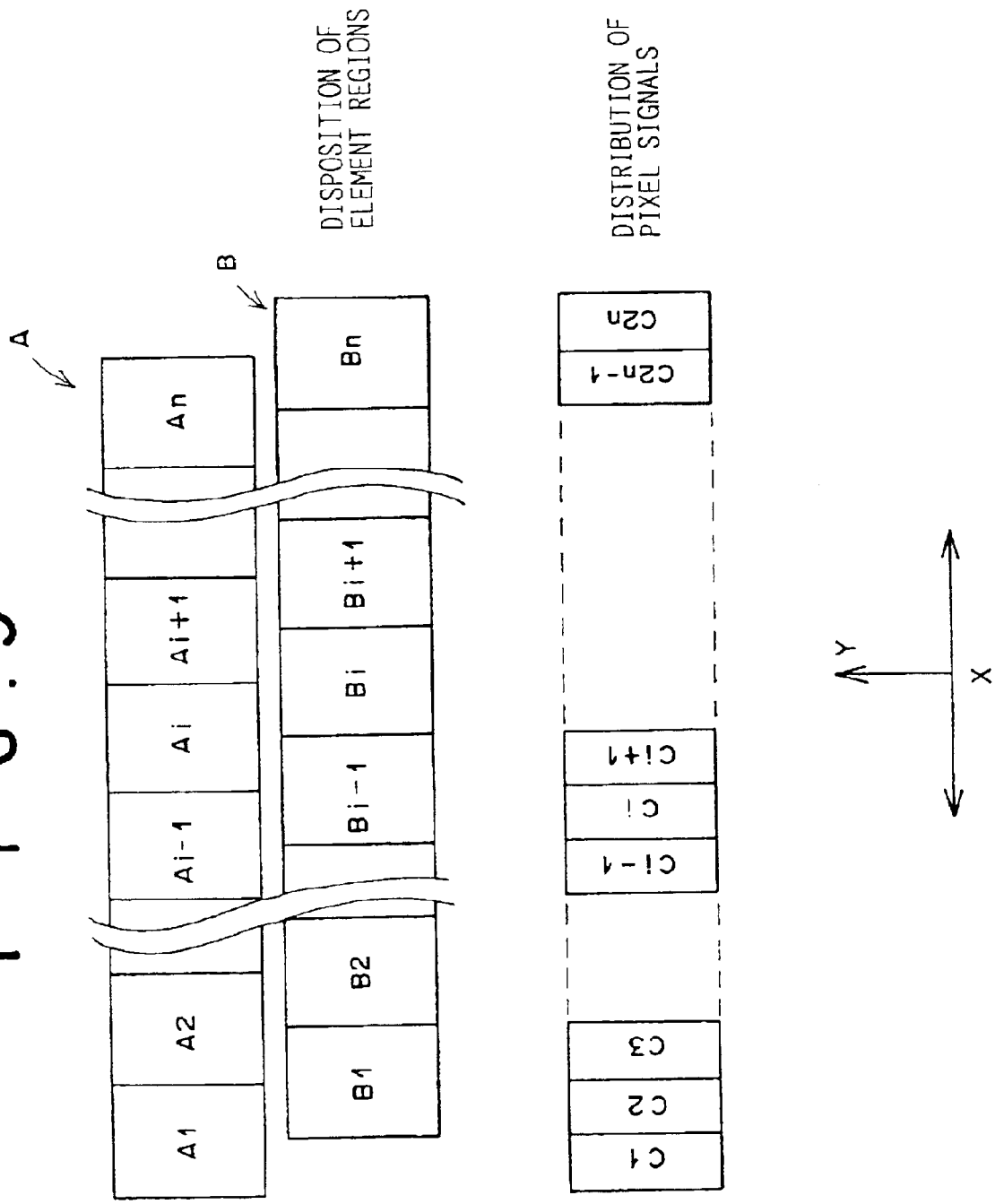

RADIATION-IMAGE READOUT APPARATUS AND LINE SENSOR TO BE DEPLOYED THEREIN

BACKGROUND OF THE INVENTION

1. Field of the Invention

The present invention relates in general to a line sensor and a radiation-image readout apparatus, and in particular to a line sensor having a broad-width light-receiving portion for readout and a radiation-image readout apparatus in which said line sensor is to be deployed.

2. Description of the Related Art

There are known line sensors wherein the light-receiving portion comprises a photodiode divided into a plurality of element regions at a predetermined pitch along the lengthwise direction thereof. These line sensors, as shown in the schematic drawing of the line sensor depicted in FIG. 8, are provided with a photodiode 1, which is divided along the lengthwise direction thereof (the direction X in FIG. 8) into a plurality of element regions 4, a transfer gate 2, and a charge transfer device 3 such as a CCD or the like for transferring through the transfer gate 2 to an external portion the charge generated at each of the element regions 4 of the photodiode 1. According to the operation of a line sensor of the configuration described above: a quantity of electrical charge is generated at each element region 4 of the photodiode 1 corresponding to the quantity of light energy received thereon; these charges are transferred via the transfer gate 2 to the charge transferring device 3, and are again transferred by the transferring device 3 through an amplifier or other signal processing device (not shown) to an external portion; such line sensors are widely used in a number of fields in apparatuses for detecting light. For example, there are radiation-image readout apparatuses for reading out the radiation-image data that has been cumulatively recorded on a stimulable phosphor sheet and which comprise a built-in line sensor for detecting radiation.

The aforementioned stimulable phosphor sheet utilizes a layer containing stimulable phosphors (storable phosphors), which upon the irradiation thereof with a radiation store a portion of the radiation energy thereof, and emit upon the subsequent irradiation thereof with a visible light, a laser light or other excitation light, a stimulated emission corresponding to the radiation energy stored therein; said layer being formed on a substrate. These stimulable phosphor sheets are widely used in conjunction with radiation-image recording/reproducing systems, wherein: the radiation-image data of a human body or other subject of photographing through which radiation has been passed is temporarily stored on a stimulable phosphor sheet; said stimulated phosphor sheet is scanned with a laser or other excitation light causing a stimulated emission to be emitted therefrom; said stimulated emission is photoelectrically read out by a photoelectric readout means to obtain an image signal; and on the other hand, said stimulable phosphor sheet is then irradiated with an erasing-light to erase the radiation energy remaining thereon (refer to Japanese Unexamined Patent Publication Nos. 55(1980)-12429, 55(1980)-116340, 56(1981)-104645, etc.).

Here, according to a radiation-image readout apparatus to be employed in the above-described radiation-image recording/reproducing system: a line light source is used as the excitation light source for irradiating the sheet with an excitation light in a line form; a line sensor provided with a plurality of photodiodes arranged in side by side along the lengthwise direction (hereinafter referred to as the main scanning direction) of the line-form portions of the sheet which have been irradiated with the excitation light by the line light source is employed as a photoelectric readout means; and a scanning means is provided for moving the line light source and the line sensor relatively from one end to the other of the sheet in the direction substantially perpendicular to the main scanning direction (hereinafter referred to as the sub-scanning direction) of the sheet; wherein the aim of this configuration is to obtain a shortening of the readout time and a reduction in the size and cost of the apparatus, have been proposed (refer to Japanese Unexamined Patent Publication Nos. 60 (1985)-111568, 60(1985)-236354, 1(1988)-101540, etc.).

Because the stimulated emission emitted from the stimulable phosphor sheet is extremely faint, it is desirable that as much of the stimulated emission as possible is received when readout thereof is performed, and there have been calls for enlarging the size of the area of the light-receiving portion of the line sensor serving as a light detecting apparatus; that is to say, there have been calls for an enlargement of the width of the photodiode portion (the size in the width direction perpendicular to the lengthwise direction of the photodiode portion).

Further, among stimulable phosphor sheets there are those that are of a comparatively large area, and when readout of a stimulable phosphor sheet having a large area of this type is performed, there are cases in which the read out is performed at a considerably large pixel size in order to shorten the readout time, etc. and there are a calls for a line sensor having a broad-width light-receiving portion (photodiode) for adequately reading out the stimulated emission emitted from the large-sized pixel regions such as those described above.

These calls have not been limited to the read out of stimulable phosphor sheets; similar calls have also been made with respect to the read out of indirect X-ray panels, low-brightness emission images, the surface detection of sheets, etc.

However, if the width of the photodiode portion is widened, the time required for transferring the entire charge cumulatively stored thereon by a charge transferring device becomes longer, that is, the readout time of the charge signal is lengthened.

Therefore, the charge stored on the photodiode portion of the line sensor upon the emission of a stimulated emission from a stimulated phosphor sheet, for example, cannot be readout within a predetermined time, and if the read out is attempted to be completed in a shortened time, a problem arises in that the charge cannot be sufficiently read out and the quality of the read out signal is not good.

SUMMARY OF THE INVENTION

The present invention has been developed in consideration of the circumstances described above, and it is a primary objective of the present invention to provide a line sensor and a radiation-image data readout apparatus in which said line sensor is to be employed, wherein, although the size in the width direction of the light-receiving portion of the line sensor, which is formed of a photodiode section, has been increased, the entire charge stored thereon can be read out expediently.

The line sensor according to the present invention comprises: two photodiode portions each divided into a plurality of element regions at a predetermined pitch along the lengthwise direction thereof; a charge transferring device provided corresponding to each of the photodiode portions for receiving and transferring the charge from each of said corresponding photodiode portions; and a transfer gate disposed between each said photodiode portion and the charge transferring device corresponding thereto; wherein the two photodiode portions are disposed adjacently with a microscopic gap therebetween in the width direction perpendicular to the lengthwise direction thereof and the charge transferring device corresponding to each of the respective adjacently disposed photodiode portion is provided on the exterior side of the width direction the photodiode portion corresponding thereto, and the width of the each of the photodiode portions is 50–500 $\mu$m.

As stated above, the subject of the present invention is a line sensor having a large width, and the primary objective of the present invention is to provide a line sensor capable of transferring the charge thereof accurately within a predetermined time and achieving high quality read out even if the width of the light-receiving portion thereof is broad. To this end, by providing the line sensor according to the present invention in a configuration wherein two photodiode portions (light-receiving portions) are disposed adjacently with a microscopic gap therebetween, and the charge transferring device corresponding to each photodiode portion is disposed on the exterior side of the width direction of the photodiode portion corresponding thereto, because the width of the light-receiving portion becomes the sum of the widths of the two photodiode portions, the width of the light receiving portion is broadened, and because the charge accumulated on each of the two photodiode portions is transferred to each of the corresponding charge transferring devices, increases in the charge transferring time of transferring the charge from the photodiode portions to the charge transferring devices can be controlled.

Further, although it is preferable, from the standpoint of advantageousness in configuration and control, that the two photodiode portions have an equal width, so far as each of said photodiode portions has a width of 50–500 $\mu$m, the two photodiode portions can have mutually different widths.

Still further, a CCD can be employed as the charge transferring device.

In addition, the positions of the element regions of each photodiode portion can be mutually offset along the lengthwise direction thereof.

Additionally, with the aim of controlling rises in the temperature of the line sensor, the charge transfer direction in which the charge is transferred by each of the charge transferring devices corresponding to the each of the respective two photodiode portions can be caused to be mutually different.

Further, in order to rapidly transfer the charge from the charge transferring device to an exterior portion, at least one of the charge transferring devices can be configured so as to transfer the charge in the direction remote from a predetermined branching point occurring along the lengthwise direction, utilizing the branching point as a border. The branching point can occur at any position of the charge transferring device along the lengthwise direction thereof; however, it is preferable that the branching point is located at the center portion of the charge transferring device.

Note that according to the present invention, as to the processing method to be applied to the charge signal obtained from each photodiode portion: the output of each element region of each photodiode portion can be correlated to the position on the stimulable phosphor sheet that is the object of a readout operation (hereinafter referred to as a target readout position) and outputted to separate image processing apparatuses; the output of each element region of each photodiode portion can be correlated at each of said separate image processing apparatuses to the target readout position; and computational processing performed to obtain the output at each said target readout position; wherein the line sensor can be further provided with a computing means, and the output of the adjacent element regions between the two photodiode portions can be subjected to addition processing and outputted.

Here, the referent of "addition processing" can be a simple addition computation, a computation of the average value, or a desired weighted addition computation.

The radiation-image data readout apparatus of the present invention utilizes the above-described line sensor according to the present invention, and comprises: a line light source for irradiating with an excitation light in a line-form a portion of a stimulable phosphor sheet on which radiation-image data has been cumulatively recorded; the aforementioned line sensor, which is for receiving and photoelectrically converting the stimulated emission emitted from a portion of the stimulable phosphor sheet upon the irradiation thereof with the excitation light in a line-form; a scanning means for moving the line light source and the line sensor relatively from one end to the other of the phosphor sheet in the direction different from the lengthwise direction of the portions of the phosphor sheet irradiated by the excitation light; and a readout means for sequentially reading out, corresponding to the movement of the scanning means, the output of the line sensor.

Here, as to the line light source, a fluorescent bulb, a cold cathode fluorescent bulb, an LED array or the like can be employed. Further, the line light source is not limited to being a light source wherein the aforementioned fluorescent bulb or the like forming the light source itself is in the form of a line, but can also include a light source in which the emitted excitation light is caused to be transformed into a line-form, as well as a broad area laser, etc. The excitation light emitted from the line light source can be an excitation light emitted in a continuous manner, or a pulse light emitted in a pulse form wherein the emission of the excitation light is repeatedly stopped; however, from the standpoint of reducing noise, it is desirable that a high-output pulse light is employed.

Further, as to the direction in which the line light source and the line sensor are moved relative to the stimulable phosphor sheet (a direction different from the lengthwise direction of the line light source and the line sensor), although it is desirable that said direction is the direction substantially perpendicular to the lengthwise direction of the line light source and the line sensor substantially perpendicularly, the direction is not limited to being a substantially perpendicular direction; for example, within the range in which a uniform excitation light can be irradiated across substantially the entire surface of the phosphor sheet, the direction in which the line light source and the line sensor are to be moved can be a direction diverging at a diagonal from the aforementioned substantially perpendicular direction, or a direction that changes in a zigzag form, for example.

Note that the line light source and the line sensor can be provided in a configuration wherein both are disposed on the same side of the stimulable phosphor sheet, or in a configuration wherein each is disposed separately on mutually opposite sides of the sheet. However, for cases in which they are provided separately on mutually opposite sides of the sheet, it is necessary that the substrate, etc. of the sheet exhibit transparency with respect to the stimulable emission so that the stimulable emission is transmitted through the side of the sheet opposite that through which the excitation light enters.

According to the line sensor of the present invention, the light-receiving portion of the line sensor, which performs photoelectrical conversion, has a pair of photodiode portions, and because each of these two photodiode portions have a width of 50–500 μm in the width direction perpendicular to the lengthwise direction thereof, an extraordinarily large width of 100–1000 μm can be obtained for the light receiving portion of the line sensor. Further, these two photodiodes are disposed adjacently and separated by a microscopic gap, and because the charge transferring devices corresponding to each of the respective photodiode portions are disposed on the exterior side of the each corresponding adjacently disposed photodiode portion, regardless of the fact that the width of the light-receiving portion is large, because the charge generated at each of the two photodiode portions is transmitted separately to the corresponding charge transferring device, the transfer of the charge from the photodiode portions to the charge transferring devices can be performed in a short period of time.

Further, because the charge transferring device is not disposed in the light-receiving portion of the line sensor, that is, is not disposed between the two photodiode portions, the light can be received with a high degree of efficiency.

Still further, if the line sensor according to the present invention is configured so that the positions of the element regions of each of the photodiode portions of are mutually offset, by performing signal processing in an exterior portion, a higher effective resolution can be realized.

In addition, in a case, for example, in which the positions of the element regions of two photodiode portions A, B are offset by only ½ of the pixel pitch occurring in the direction of the line, by rearranging the pixel signal of the two lines into arrays at a portion exterior to the elements, the effective resolution can be approximately doubled.

FIG. 9 shows the disposition of the element regions of the above-described photodiode and the arrangement of the pixel signal into arrays after the exterior portion processing has been performed. As shown in FIG. 9, the photodiode A is divided into element regions A1, A2, A3, . . . , An, and the photodiode B is divided into element regions B1, B2, B3, . . . , Bn. Note that Ai and Bi are offset by only ½ a pixel in the line direction (along the direction indicated by the arrow X). The output S (A1), S (A2), . . . , S (An), and the output S (B1), S (B2), . . . , S (Bn) from each of the respective element regions of the photodiodes A and B, are subjected to compositional processing wherein said outputs are combined with the corresponding outputs of the positions corresponding to the Y coordinate value of the same target readout position at an external memory portion or the like, whereby an image signal is formed. As to this compositional processing, the addition processing described above can be applied and the pixel signal of n number of pixels can be obtained, however, the pixel signals of 2n pixels Ci (C1, C2, C3, . . . , C2n) can be obtained according to the following formula (1).

$C1=S(A1), C2=S(B1),$ $C3=S(A2), C4=S(B2),$

. . .

$C(2n-1)=S(An),$ $C2n=S(Bn)$

If compositional processing of this sort is performed, because the number of the pixels signals becomes twice, 2n, the number of the element regions, n, the effective resolution can be substantially doubled.

Further, although the charge transferred from the charge transferring device to an amplifier provided in the line sensor and is amplified by said amplifier and then outputted to an external portion, this amplifier is the main producer of heat within the line sensor. As a line sensor, because the magnitude of the dark current becomes large as the temperature becomes higher, it is desirable that, so far as it is possible, the temperature be prevented from becoming high. According to the present invention, if the charge transfer direction in which the charge is transmitted by each of the charge transferring devices corresponding to the two photodiode portions is caused to be mutually different, because the amplifier is dispersed on both ends of the line sensor, the heat producing portions of the line sensor as a whole can be divided, and the heat produced thereby becomes easy to dissipate. As a result, an increase in the temperature of the line sensor can be controlled, and an increase in dark noise can be prevented.

Still further, because the charge transferring device, which is a CCD or the like, transfers the charge signal of the entire span of the lengthwise direction of the photodiode portion sequentially to an external portion, the longer the length of the photodiode portion, the longer the charge transferring time becomes. Therefore, if the charge transferring device is divided into two regions at a predetermined branching point, which acts as a border, and the charge transfer direction of said two regions is such that the charge of each is transferred in the direction remote from the branching point (the direction toward the end of the lengthwise direction of the line sensor), because the effective length in the lengthwise direction of each region is shorter, the charge transferring time of transferring the charge from the charge transferring device to an external portion can be shortened, and as a result, the readout time of the entire line sensor can be shortened.

In addition, if the line sensor according to the present invention is applied in a readout apparatus for reading out radiation-image data stored on a stimulable phosphor sheet, along with ensuring that the area of the light-receiving portion is large, because the transfer of the charge can be carried out rapidly, when the radiation-image data cumulatively stored on a stimulable phosphor sheet is to be read out, it is possible to transfer the charge within a predetermined amount of time and the quality of the readout can be improved.

BRIEF DESCRIPTION OF THE DRAWINGS

FIG. 1 is a schematic drawing of a first embodiment of the radiation-image data readout apparatus according to present invention, FIG. 4 is a drawing of the configuration of the second embodiment of the line sensor 25 according to the present invention, FIG. 6 is a schematic drawing of another embodiment of the radiation-image data readout apparatus according to present invention, FIG. 8 is a drawing illustrating conventional apparatuses found in the related art, and FIG. 9 is a drawing illustrating a composition method of performing composition processing.

DESCRIPTION OF THE PREFERRED EMBODIMENTS

Hereinafter the preferred embodiments of the line sensor and the radiation-image data readout apparatus in which said line sensor is utilized according to the present invention will be explained with reference to the attached drawings.

Figure 2:
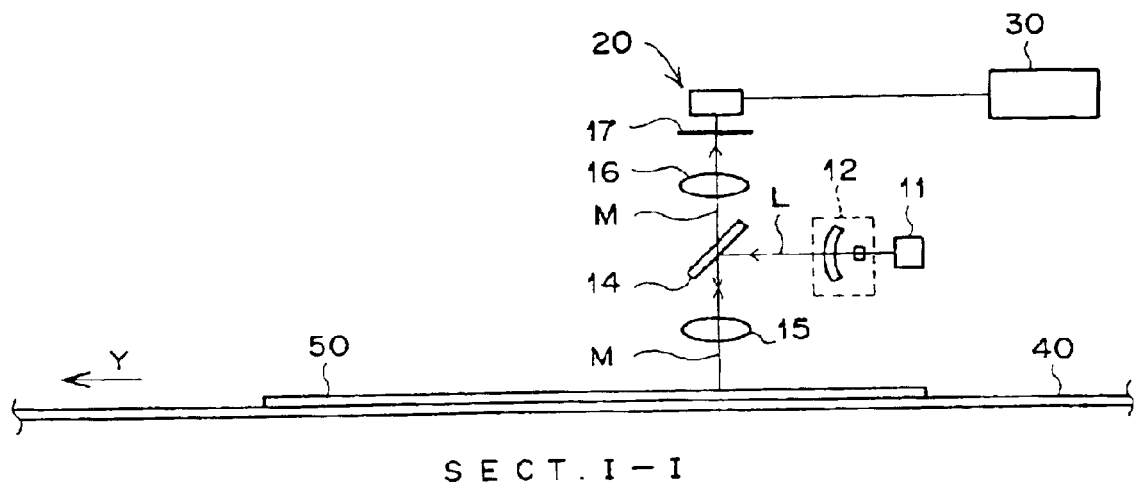
FIG. 2 is a cross-sectional view of the radiation-image data readout apparatus shown in FIG. 1 taken along the line I—I.
Figure 3:
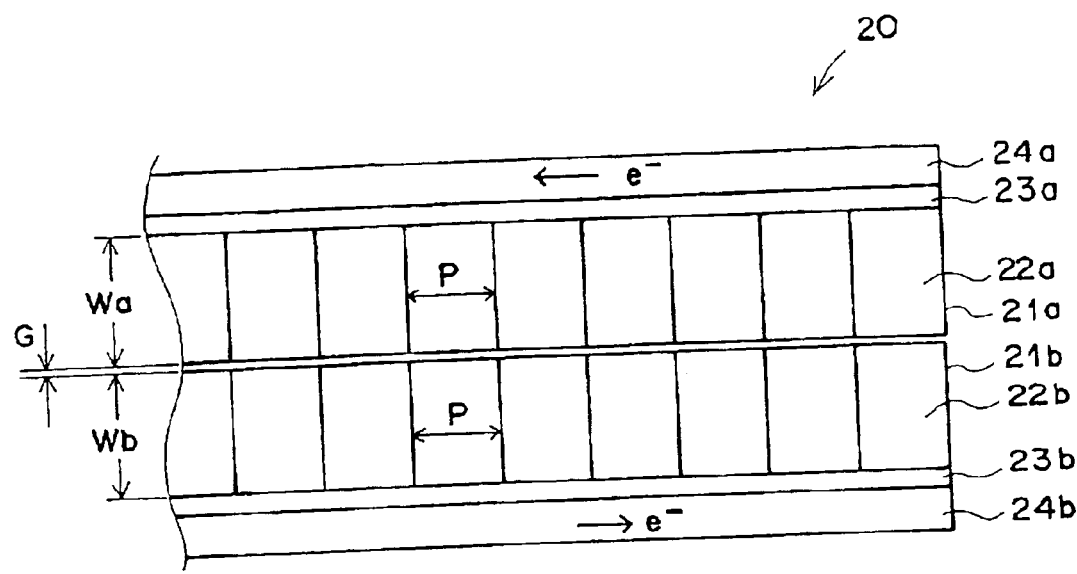
FIG. 3 is a drawing of the configuration of the first embodiment of the line sensor 20 according to the present invention.
Figure 3:
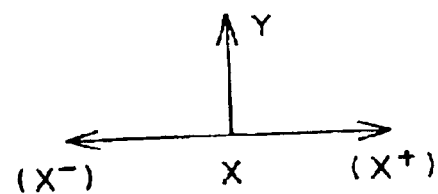

FIG. 1 shows a perspective view of the first embodiment of the line sensor and the radiation-image data readout apparatus in which said line sensor is utilized according to the present invention. FIG. 2 shows a cross-sectional view taken along the line I—I of the radiation-image data readout apparatus shown in FIG. 1. FIG. 3 is a drawing of the detailed configuration of the line sensor 20 shown in FIGS. 1 and 2.

The radiation-image data readout apparatus shown in FIGS. 1 and 2 comprises: scanning belt 40 for conveying in the direction indicated by the arrow Y a stimulable phosphor sheet (hereinafter referred to simply as a sheet) 50 on which radiation-image data has been cumulatively recorded and which has been loaded onto the scanning belt 40; a broad area laser (hereinafter referred to as a BLD) 11 for emitting a line form excitation light substantially parallel to the surface of the sheet 50; an optical system 12 formed of an assembly consisting of a collimator lens for focusing the line-form excitation light L emitted from the BLD 11 and a toric lens for unidirectionally expanding the beam thereof; a dichroic mirror 14, which is disposed at a 45 degree angle with respect to the surface of the sheet 50, for reflecting the excitation light L in a substantially perpendicular direction toward the phosphor sheet 50 so as to transmit the stimulated emission M, which is described below; a lens array 15 (a lens formed of a plurality of refractive index distribution lenses, and hereinafter referred to as a first Selfoc lens array), which is a refractive index distribution type lens array for focusing the excitation light L reflected by the dichroic mirror 14 in a line form extending in the direction X on the phosphor sheet 50, and converting the stimulated emission M emitted from the phosphor sheet 50 upon the irradiation thereof by the excitation light and which corresponds to the radiation energy stored on said phosphor sheet 50 to a parallel light flux; a second Selfoc lens array 16 for focusing onto the photodiode portions 21a and 21b forming the light-receiving portion of a line sensor 20, which is described below, the stimulated emission M that has been converted to a parallel light flux by the first Selfoc lens array 15 and reflected by the dichroic mirror 14; an excitation light cutoff filter 17 for cutting off the small amount of the excitation light L reflected from the surface of the phosphor sheet 50 that becomes mixed with the stimulated emission M transmitted by the second Selfoc lens array 16, and transmitting the stimulated emission M; a line sensor 20 for receiving and photoelectrically converting the stimulated emission M transmitted by the excitation light cutoff filter 17; and an image signal forming means 30 for adding the output of the element regions 22a and 22b of the two photodiode portions 21a and 21b (refer to FIG. 3) of the line sensor 20, correlating the result thereof to each respective position of the sheet 50 and outputting an image signal obtained thereby.

The first Selfoc lens array 15 array serves as an imaging surface onto which the image formed by the stimulated emission M occurring on the phosphor sheet 50 is focused at a 1 to 1 magnification ratio on the dichroic mirror 14, and the second Selfoc lens array 16 array serves to focus onto the light-receiving surfaces of the photodiode portions 21a and 21b at a 1 to 1 magnification ratio the image formed by the stimulated emission M occurring on the dichroic mirror 14.

Further, the optical system 12 formed of the aforementioned collimator lens and toric lens expands the excitation light emitted from the ELD 11 onto a desired irradiation area on the phosphor sheet 50.

As shown in FIG. 3, the line sensor 20 is provided with two photodiode portions 21a and 21b disposed adjacently and having a microscopic gap G therebetween in the direction of the width (along the direction indicated by the arrow Y) thereof, and a CCD (charge transferring device) 24a and a CCD 24b, each corresponding to respective photodiode portions 21a and 21b, disposed on the exterior sides of the width direction of said photodiodes 21a and 21b. Each of the photodiode portions 21a and 21b has a width Wa and Wb, respectively, of 100 $\mu$m, and each of said photodiode portions 21a and 21b is divided along the lengthwise direction (the direction indicated by the arrow X) thereof into a plurality of element regions 22a and 22b, respectively. Each of the element regions 22a and 22b receives the light of the stimulated emission and converts said received light of the stimulated emission to an electrical charge corresponding to the quantity of light thereof; said converted charges are then transferred through respective transfer gates 23a and 23b corresponding to each of photodiode portions 21a and 21b to the CCD 24a and the CCD 24b, respectively. The charges received at the CCDs 24a and 24b are transferred through an amplifier or other signal processing apparatus (not shown) to the image signal forming means 30. Note that as shown in FIG. 3, the CCDs 24a and 24b transfer in mutually different directions (the directions indicated by the arrow $X^-$ and the arrow $X^+$) the charges received thereon.

Next, the operation of the radiation-image readout apparatus according to the current embodiment will be explained.

First, by moving the scanning belt 40 in the direction of the arrow Y, the phosphor sheet 50 that has been loaded onto the scanning belt 40 and on which radiation image data has been recorded is conveyed in the direction of the arrow Y. At this time, the conveyance speed of the phosphor sheet 50 is equal to that of the scanning belt 40, and the speed of the belt 40 is input to the image readout means 30.

Meanwhile, BLD 11 projects the line-form excitation light L in a direction substantially parallel with respect to the surface of the phosphor sheet 50. This excitation light L is converted to a parallel beam by the optical system 12 formed of the collimator lens and the toric lens disposed on the optical path thereof, and reflected by the dichroic mirror 14 in a perpendicular direction so as to enter the phosphor sheet 50 at a right angle; this reflected light is focused into a line-form beam (the width thereof being 100 um) extending in the direction indicated by the arrow X and to enter said phosphor sheet 50 at a right angle by the first Selfoc lens array 15.

Upon the irradiation of the sheet 50 by the excitation light L, a high-intensity stimulated emission M corresponding to the radiation image that has been cumulatively recorded on the phosphor sheet 50 is emitted from the zone irradiated by the excitation light and the vicinity thereof. This stimulated emission M is converted to a parallel light flux by the first Selfoc lens array 15, transmitted by the dichroic mirror 14, and focused onto the light receiving surfaces of the two photodiode portions 21*a* and 21*b* forming the line sensor 20 by the second Selfoc lens array 16. At this time, the small amount of excitation light L reflected from the surface of the phosphor sheet 50 and included in the stimulated emission M transmitted by the second Selfoc lens array 16 is cutoff by the excitation light cutoff filter 17.

The photodiode portions 21*a* and 21*b* forming the light-receiving surface of the line sensor 20 photoelectrically convert the light of the stimulated emission M received thereon, and electrical charges are generated at each of element regions 22*a* and 22*b*. These charges are transferred via the respective transfer gates 23*a* and 23*b* to the respective CCDs 24*a* and 24*b*, and the charge received by the CCDs 24*a* and 24*b* are inputted to the image signal forming means 30 through an amplifier or other signal processing apparatus (not shown). The image signal forming means adds together the charges from each of the element regions mutually adjacent in the width direction of the two adjacently disposed photodiode portions 21*a* and 21*b*, and cumulatively records, based on the movement speed of the scanning belt 40, the data of each said position non the sheet 50 in a memory region correlated to each corresponding position of the sheet 50; then, said cumulatively recorded data is outputted as image data to an image processing apparatus. Note that because, in contrast to the transferring of the charge thereof in the direction indicated by the arrow $X^-$ by the CCD 24*a*, the CCD 24*b* transfers the charge thereof in the direction indicated by the arrow $X^+$, in the example shown in FIG. 3, the amplifier connected to the CCD 24*a* is disposed at the left end of the line senor, and the amplifier connected to the CCD 24*b* is disposed at the right end of the line senor.

According to the current embodiment, although for the sake of simplicity in explanation an example has been given in which the optical system disposed between the sheet 50 and the line sensor 20 has been set to focus at a 1:1 magnification ratio, of course, an enlarging and reducing optical system can be employed. However, from the standpoint of improving the focusing efficiency, it is preferable that a 1:1 magnification rate or an enlarging optical system is employed.

According to the radiation-image data readout apparatus utilizing the line sensor of the current embodiment: by adopting a configuration in which the line sensor is provided with two photodiode portions 21*a* and 21*b* disposed adjacently and having a microscopic gap therebetween, and a CCD 24*a* and a CCD 24*b*, corresponding to the photodiode portions 21*a* and 21*b*, are provided on the exterior side of the photodiode portions 21*a* and 21*b*, respectively; because the width of the light receiving portion in the width direction of the line sensor (along the direction indicated by the arrow Y) becomes the sum of the widths of the two photodiode portions 21*a* and 21*b* (approximately 200 um), the effective width of the light receiving portions is broadened, and because the charge accumulated on each of the two photodiode portions 21*a* and 21*b* is transferred to each of corresponding charge transferring devices 24*a* and 24*b*, increases in the charge transferring time of transferring the charge from the photodiode portions to the charge transferring devices can be suppressed. As a result, the primary objective of the present invention is realized, that is, even for cases in which the width of the light-receiving portion is broad, the charge can be transferred accurately within a predetermined period of time, and a high quality read out can be achieved.

Further, according to the current embodiment, because the charge transferring directions of the CCDs 24*a* and 24*b* are as indicated by the arrows $X^-$ and $X^+$, respectively, that is, mutually different, the respective amplifier corresponding to each of the CCDs 24*a* and 24*b* can be disposed separately at the ends in the lengthwise direction of the line sensor, whereby the heat producing portions of the line sensor are dispersed and increases in the temperature of the line can be suppressed thereby, an increase in the quantity of dark current can be prevented, and a high quality read out can be attained.

FIG. 4 is a schematic drawing of another line sensor 25 according to the present invention. The line sensor 25 of the configuration shown in FIG. 4 can be applied as a second embodiment of the line sensor according to the present invention in the radiation-image data readout apparatus shown in FIG. 1.

With regard to the radiation-image data readout apparatus utilizing the second embodiment of the line sensor according to the present invention, all structures and functions except for those of the line sensor are the same as those of the above described structures and functions of the radiation-image data readout apparatus according to the first embodiment of the present invention utilizing the line sensor 20, except for those of the line sensor 20; therefore, in so far as it is not particularly required, further explanation thereof is omitted.

As shown in FIG. 4, the line sensor 25 according to the second embodiment of the present invention, in the same manner as the line sensor 20 according to the first embodiment of the present invention shown in FIG. 3, is provided with two photodiode portions 21*a* and 21*b* disposed adjacently in the widthwise direction thereof and having a microscopic gap G therebetween, and a CCD 24*a*' and a CCD 24*b*', corresponding to each of the respective photodiode portions 21*a* and 21*b*, disposed on the exterior sides of the width direction of said photodiodes 21*a* and 21*b*. Each of the photodiode portions 21*a* and 21*b* has a width of 100 um along the direction indicated by the arrow Y, and is divided along the lengthwise direction (the direction indicated by the arrow X) thereof into a plurality of element regions 22*a* and 22*b*, respectively. Each of element regions 22*a* and 22*b* receives the light of the stimulated emission and converts said received light of the stimulated emission to an electrical charge corresponding to the quantity of light thereof; said converted charges are then transferred through the respective transfer gates 23*a*' and 23*b*' corresponding to each of photodiode portions 21*a* and 21*b* to the CCD 24*a*' and the CCD 24*b*', respectively. Here, the charges received at the CCDs 24*a*' and 24*b*', which have been received by a method different from the method utilized by the CCDs 24*a* and 24*b* of the line sensor 20 shown in FIG. 3, are transferred to an amplifier or other signal processing apparatus. As shown in FIG. 4, the centerportions (refer to FIG. 4) occurring in the lengthwise direction thereof (the direction indicated by the arrow X) of both of CCDs 24*a*' and 24*b*' are divided into two regions, right and left. The left-side region transmits the charge received thereon toward the left end in the direction indicated by the arrow $X^+$, whereas the right-side region transmits the charge received thereon toward the right end in the direction indicated by the arrow $X^-$.

According to the radiation-image data readout apparatus utilizing the second embodiment of the line sensor 25 of the present invention shown in FIG. 4: because the width of the light-receiving portion becomes the sum of the widths of the two photodiode portions 21a and 21b (substantially 200 um), in the same manner as occurs in the above-described radiation-image data readout apparatus utilizing the line senor 20 according to the first embodiment of the present invention, the effective width of the light receiving portions is broadened, and because the charge accumulated on each of the two photodiode portions 21a and 21b is transferred to each of corresponding charge transferring devices 24a' and 24b', increases in the charge transferring time of transferring the charge from the photodiode portions to the charge transferring devices can be controlled. As a result, the primary objective of the present invention is achieved, that is, even for cases in which the width of the light-receiving portion is broad, the charge can be transmitted accurately within a predetermined period of time, and a high quality read out can be achieved.

Further, according to the line sensor 25 of the second embodiment, because both CCD 24a' and CCD 24b' are divided into two portions, left and right, each region transfers only the charge from the photodiode portion said region is responsible for to the external portion, whereby the length of the photodiode portion which each region is responsible for becomes shorter, and the transfer time for transferring the charge from the CCD to the external portion can be shortened. As a result, the readout time for reading out the entire line sensor can be shortened.

Figure 5:
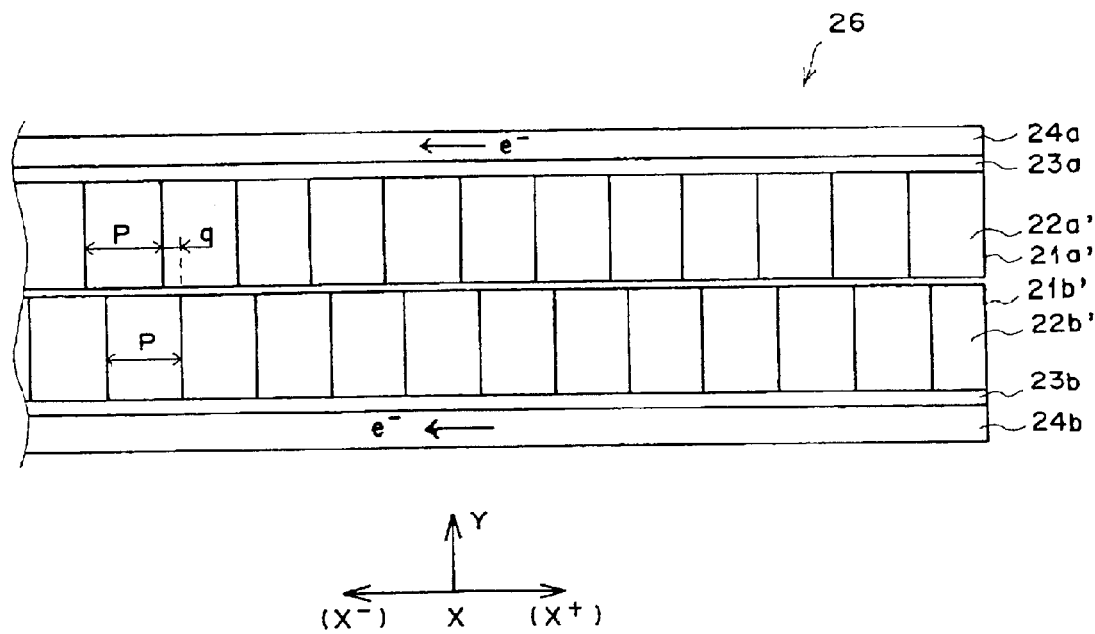
FIG. 5 is a drawing of the configuration of the third embodiment of the line sensor 26 according to the present invention.

FIG. 5 is a schematic drawing of another line sensor 26 according to the present invention. The line sensor 26 of the configuration shown in FIG. 5 can be applied as a third embodiment of the line sensor according to the present invention in the radiation-image data readout apparatus shown in FIG. 1.

According to the radiation-image data readout apparatus utilizing the third embodiment of the line sensor according to the present invention, all structures and functions except for those of the line sensor are the same as those of the above described structures and functions of the radiation-image data readout apparatus according to the first embodiment of the present invention utilizing the line sensor 20, except for those of the line sensor 20; therefore, in so far as it is not particularly required, further explanation thereof is omitted.

As shown in FIG. 5, the line sensor 26 according to the third embodiment of the present invention, in the same manner as the line sensor 20 according to the first embodiment of the present invention shown in FIG. 3, is provided with two photodiode portions 21a' and 21b' disposed adjacently in the widthwise direction thereof and having a microscopic gap G therebetween, and a CCD 24a' and a CCD 24b', corresponding to each of respective photodiode portions 21a' and 21b', disposed on the exterior sides of the width direction of said photodiodes 21a' and 21b'. Each of the photodiode portions 21a' and 21b' has a width of 100 um along the direction indicated by the arrow Y, and is divided along the lengthwise direction (the direction indicated by the arrow X) thereof into a plurality of element regions 22a' and 22b', respectively. Each of element regions 22a' and 22b' receives the light of the stimulated emission and converts said received light of the stimulated emission to a quantity of electrical charge corresponding to the quantity of light thereof; said converted charges are then transferred through the respective transfer gates 23a and 23b corresponding to each of photodiode portions 21a' and 21b' to the CCD 24a and the CCD 24b, respectively. Here, the charges received at the CCD's 24a and 24b are transferred through an amplifier or other signal processing apparatus (not shown) to the image signal forming means 30. Note that as shown in FIG. 5, both of the CCDs 24a and 24b transfer their respective charges in the direction indicated by the arrow $X^-$.

Here, the photodiode portions 21a' and 21b' of the line sensor 26, in the same manner as the line sensor 20, are divided along the lengthwise direction thereof and at a predetermined pitch P into respective pluralities of element regions 22a' and 22b', however, the positions of the element regions 22a' and 22b' of respective photodiode portions 21a' and 21b' are mutually offset in the lengthwise direction thereof by only a portion q shown in FIG. 5.

According to the radiation-image data readout apparatus utilizing the third embodiment of the line sensor 26 of the present invention shown in FIG. 5: because the width of the light-receiving portion becomes the sum of the widths of the two photodiode portions 21a' and 21b' (approximately 200 um), in the same manner as occurs in the above-described radiation-image data readout apparatuses utilizing the line sensors according to the first and second embodiments of the present invention, the effective width of the light receiving portions is broadened, and because the charge accumulated on each of the two photodiode portions 21a' and 21b' is transmitted to each of corresponding charge transferring devices 24a and 24b, increases in the charge transferring time of transferring the charge from the photodiode portions to the charge transferring devices can be suppressed. As a result, the primary objective of the present invention is achieved, that is, even for cases in which the width of the light-receiving portion is broad, the charge can be transferred accurately within a predetermined period of time, and a high quality read out can be achieved.

Further, according to the line sensor 25 of the third embodiment, because a configuration wherein the positions of the element regions 22a' and 22b' of respective photodiode portions 21a' and 21b' are mutually offset in the lengthwise direction thereof, has been adopted, as described above, by performing signal processing in an external portion (such as the image signal forming means 30), the effective resolution can be improved.

Although the preferred embodiments of the line sensor and radiation-image data readout apparatus in which said line sensor is employed according to the present invention have been explained above, the line sensor and radiation-image data readout apparatus in which said line sensor is employed according to the present invention are not limited thereto; for example, the two photodiode portions can be of a configuration wherein each said photodiode portion is divided into a plurality of element regions at a mutually different pitch (according to the embodiments described above, the two photodiodes are divided into a plurality of element regions at the same pitch P); the two photodiode portions can each be of mutually different widths (according to the embodiments described above, the two photodiodes are the same); or a configuration wherein the above described embodiments are combined can be adopted, etc. Further, a configuration further comprising image signal processing apparatuses for performing a variety of signal processing operations, or an erasing means for adequately dissipating the radiation energy remaining on a sheet after said sheet has been completely irradiated with the excitation light, can be adopted.

Further, according to the above-described radiation-image data readout apparatus, a configuration in which the optical path of the excitation light L and the optical path of the stimulated emission M have been caused to overlap within one portion has been adopted with the aim of improving the compactness of the apparatus by a level, however, the radiation-image data readout apparatus according to the present invention is not limited to being of such configuration; for example, as shown in FIG. 6, a configuration in which the optical path of the excitation light L and the optical path of the stimulated emission M are not overlapped whatsoever can be applied.

Figure 7:
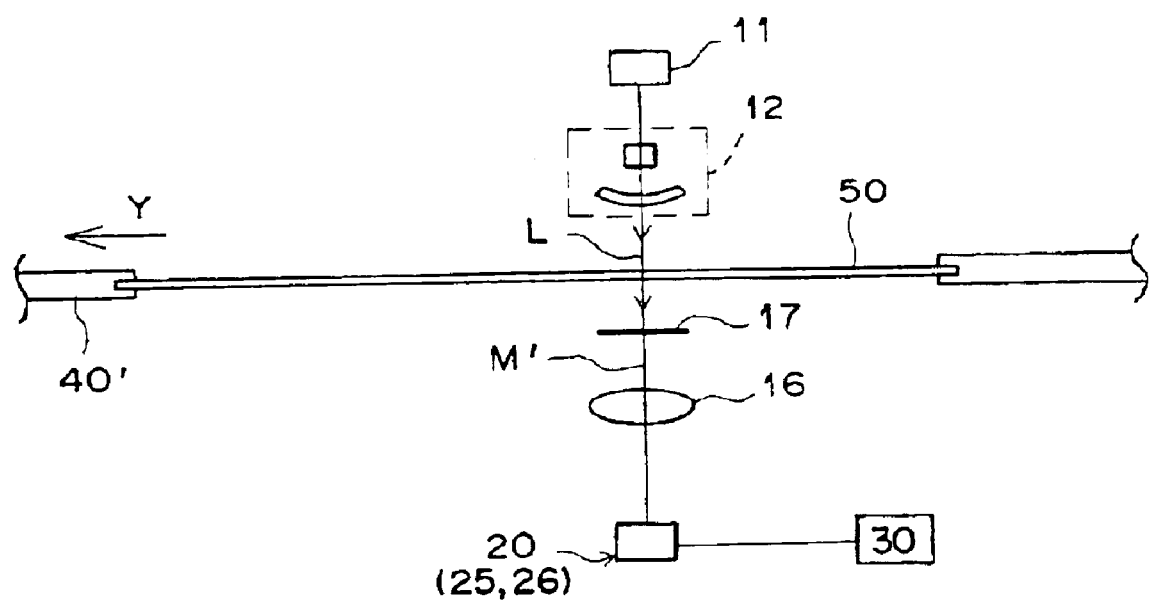
FIG. 7 is a schematic drawing of another embodiment of the radiation-image data readout apparatus according to present invention.

Still further, according to the radiation-image data readout apparatus according to each of the embodiments described above, a configuration has been adopted wherein the light source of the excitation light and the line sensor are disposed on the same side of the sheet, and the stimulated emission m is emitted and received from the surface of the sheet the excitation light has entered, however, the radiation-image data readout apparatus according to the present invention is not limited to being of such configuration; as shown in FIG. 7, by utilizing a stimulable phosphor sheet in which the substrate thereof is formed of a material that exhibits transparency with respect to the stimulated emission, a configuration wherein the light source of the excitation light and the line sensor can be disposed on mutually different sides of the sheet, and the stimulated emission m is emitted and received from the surface of the sheet on the opposite side of the surface into which the excitation light has entered, can be adopted.

In addition, as to the sheet employed in the above-described radiation-image data readout apparatus, a radiation-energy subtraction stimulable phosphor sheet for recording a radiation-image data formed of radiation containing a comparatively large high-energy component and a radiation-image data formed of radiation containing a comparatively large low-energy component on the front and back surfaces thereof, respectively, from which two separate stimulated emissions, corresponding to the front and back surfaces thereof, respectively, is caused to be emitted and is obtained, can be employed, and a readout apparatus provided with a line sensor disposed on each side of said sheet and correlating the pixels of the image data read out from the front and back surfaces of the sheet and performing subtraction processing therebetween can be provided; however, in this case, too, the line sensor having the structures and assembly described above can be used as the line sensors disposed on both sides of the sheet.

Additionally, as to the sheet to be used as a radiation-energy subtraction stimulable phosphor sheet, too, a sheet having a configuration wherein walls formed of a material exhibiting reflectivity with respect to the excitation light partition the sheet in the direction of the thickness thereof into a plurality of microscopic cells, etc., a so-called anisotropic sheet, can be used.

Further, according to each of the examples described above, the radiation-image data readout apparatus utilizing the line sensor according to the present invention has been employed, however, the line sensor according to the present invention is not limited to being utilized in a radiation-image data readout apparatus, but can be applied to any type of apparatus requiring that read out be performed by a line sensor having a broad-width light-receiving portion.

What is claimed is:

1. A line sensor comprising
two photodiode portions each divided into a plurality of element regions at a predetermined pitch along the lengthwise direction thereof,
a charge transferring device provided corresponding to each of the photodiode portions for receiving and transferring the charge from each said corresponding photodiode portion, and
a transfer gate disposed between each said photodiode portion and the charge transferring device corresponding thereto, wherein the two photodiode portions are provided adjacently in the widthwise direction perpendicular to the lengthwise directions thereof with a microscopic gap therebetween and the charge transferring device corresponding to each of the respective adjacently disposed photodiode portions is provided on the exterior side of the width direction the photodiode portion corresponding thereto, and the width of the each of the photodiode portions is 50–500 $\mu$m, wherein the positions of the element regions of each photodiode portion can be mutually offset along the lengthwise direction thereof.

2. A line sensor as defined in claim 1, wherein
the change transferring devices corresponding to each of the respective two photodiode portions transfer the respective charges thereof in mutually different directions.

3. A line sensor as defined in claim 1, wherein
a predetermined branching point is taken as the border of at least one of the charge transferring devices, and
said at least one of the charge transferring devices transfers the respective charge thereof in the direction remote from said branching point.

4. The line sensor of claim 1, wherein the outputs of the two charge transfer devices are input to an image forming device, wherein the image forming device adds together charges from each of the element regions mutually adjacent in the width direction of the two photodiode portions.

5. The line sensor of claim 4, wherein the image forming device further cumulatively forms image data as the two photodiode portions receive successive data during relative movement of the line sensor.

6. The line sensor of claim 1, wherein the element regions of each photodiode portion include first element regions for a first of the two photodiode portions and second element regions for a second of the two photodiode portions, wherein the first element regions have first edge walls in a direction perpendicular to the lengthwise direction and the second element regions have second edge walls perpendicular to the lengthwise direction and the first and second edge walls are offset from each other by a distance in the lengthwise direction, the distance being less than a width of the first and second element of regions.

7. A line sensor comprising
two photodiode portions each divided into a plurality of element regions at a predetermined pitch along the lengthwise direction thereof,
a charge transferring device provided corresponding to each of the photodiode portions for receiving and transferring the charge from each said corresponding photodiode portion, and
a transfer gate disposed between each said photodiode portion and the charge transferring device corresponding thereto, wherein the two photodiode portions are provided adjacently in the widthwise direction perpendicular to the lengthwise directions thereof with a microscopic gap therebetween and the charge transferring device corresponding to each of the respective adjacently disposed photodiode portions is provided on the exterior side of the width direction the photodiode portion corresponding thereto, and the width of the each of the photodiode portions is 50–500 $\mu$m, wherein the charge transferring devices corresponding to each of the two respective photodiode portions transfer the respective charges thereof in mutually different directions.

8. A line sensor as defined in claim 7, wherein a predetermined branching point is taken as the border of at least one of the charge transferring devices, and said at least one of the charge transferring devices transfers the respective charge thereof in the direction remote from said branching point.

9. A radiation-image data readout apparatus, comprising a line light source for irradiating with an excitation light in a line-form a portion of a stimulable phosphor sheet on which radiation-image data has been cumulatively recorded, a line sensor for receiving and photoelectrically converting the stimulated emission emitted from a portion of the stimulable phosphor sheet upon the irradiation thereof with the excitation light in a line-form, a scanning means for moving the line light source and the line sensor relatively from one end to the other of the phosphor sheet in the direction different from the lengthwise direction of the portions of the stimulable phosphor sheet irradiated by the excitation light, and a readout means for sequentially reading out, corresponding to the movement of the scanning means, the output of the line sensor, wherein said line sensor is the line sensor according to any one of the claims 2, 3, 4, 5, or 6.

* * * * *